United States Patent [19]

Mello Ribeiro Pinto

[11] Patent Number: 4,614,476
[45] Date of Patent: Sep. 30, 1986

[54] MECHANICAL SUGAR CANE GRAB LOADER

[75] Inventor: Luis A. C. Mello Ribeiro Pinto, Ribeirao Preto SP, Brazil

[73] Assignee: Santal Euipamentos S.A. Comercio E Industria, Brazil

[21] Appl. No.: 538,382

[22] Filed: Oct. 3, 1983

[30] Foreign Application Priority Data

Oct. 11, 1982 [BR] Brazil .................................. 8206002
Nov. 19, 1982 [BR] Brazil .................................. 8206773
May 3, 1983 [BR] Brazil .................................. 8302267

[51] Int. Cl.⁴ ...................... B66C 1/00; A01B 49/04; A01B 61/04; E02F 3/76
[52] U.S. Cl. .................................. 414/729; 414/730; 172/777
[58] Field of Search ............... 172/777; 414/731, 740, 414/685, 729, 730, 23

[56] References Cited

U.S. PATENT DOCUMENTS

| 2,794,273 | 6/1957 | Pilkington et al. | 172/777 X |
| 2,932,101 | 4/1960 | Ludowici | 414/685 X |
| 2,984,029 | 5/1961 | Pederson | 172/777 |
| 2,993,285 | 7/1961 | Hoxie | 172/777 |
| 3,487,958 | 1/1970 | Shook et al. | 414/685 X |
| 3,525,447 | 8/1970 | Witikko | 414/740 X |
| 3,579,872 | 5/1971 | Jantzen | 37/66 |
| 3,732,989 | 5/1973 | Cagle | 414/740 |
| 3,782,567 | 1/1974 | Likas et al. | 414/731 X |
| 4,353,424 | 10/1982 | Schenck et al. | 414/739 X |
| 4,364,191 | 12/1982 | Cazes | 172/777 X |

FOREIGN PATENT DOCUMENTS

| 401083 | 1/1970 | Australia | 414/740 |
| 76135 | 4/1983 | European Pat. Off. | 414/730 |
| 785402 | 10/1957 | United Kingdom | 414/731 |
| 209133 | 1/1968 | U.S.S.R. | 414/731 |
| 0604920 | 4/1978 | U.S.S.R. | 172/777 |

OTHER PUBLICATIONS

Mullin, H. A., Mullin Dozer Blade Tooth Shanks Aids in Slash Disposal and Fire Line Construction, *Fire Control Notes*, vol. 11, Oct. 1950, No. 4, pp. 6–9.

Primary Examiner—Robert E. Bagwill
Assistant Examiner—Terrence L. B. Brown
Attorney, Agent, or Firm—Darby & Darby

[57] ABSTRACT

An improved sugar cane grab loader has a hydraulically actuated grab and supporting boom, and a mechanical pushpiler. The pushpiler has floating teeth to prevent undue ground penetration during its scraping action. The teeth move in free but limited fashion in a rearwardly inclined direction. The boom lifts the grab from the soil by a controlled height during closing action of the grab around the cane bundled on the ground.

11 Claims, 26 Drawing Figures

MECHANICAL SUGAR CANE GRAB LOADER

BACKGROUND OF THE INVENTION

1. Field of the Invention

This invention relates to mechanical sugar cane grab loaders generally. In particular, the invention relates to mechanical sugar cane grab loaders having an articulated grab, a boom for lifting the grab, and a pushpiler for pushing cane into bundles to be grabbed.

2. Description of the Prior Art

A general type of mechanical sugar cane grab loader uses a hydraulically actuated, articulated grab to collect or "grab" a bundle of sugar cane on top of the soil, a hydraulically actuated boom to lift the grab, and mechanical means for pushing the cane over the soil to form the bundle which is subsequently grabbed. The mechanical means may be referred to as pushpiler.

The main problem presented by the operation of mechanical sugar cane grab loaders is the significant amount of trash, including soil particles, gravel, stones, roots, etc., collected together with the sugar can by the action of the grab and the pushpiler when they penetrate the ground, over which is lying the sugar cane.

The state-of-the-art pushpilers normally used by grab cane loaders are generally constituted by two curved elements, concave shaped, terminated over the ground by two tips with knife edges, that scrape the soil and collect and bundle the sugar cane by pushing forward by the loader motion. These pushpilers are articulated on the front part of the loader structure, and their height controlled, generally by hydraulic means, by the operator. This way, the soil scraped by the pushpiler tips slides upwards along the curved elements of the pushpiler with the cane, and gets mixed with the bundle of cane.

The height above the ground of the pushpiler and the grab (during its closing movement) must be continuously and carefully controlled by the operator to minimize ground penetration and consequent soil contamination of the cane being loaded. This is a difficult and tiring operation, which results normally in a significant amount of trash present in the cane loaded, as already mentioned.

OBJECTS AND SUMMARY

It is the general objective of the present invention to provide means for effectively reducing the soil contamination of the cane loaded by this type of implement, providing a better quality sugar cane, and ease of operation with less equipment needed.

These means are represented by a floating pushpiler mounted on a loader. In a first version of this invention, the floating pushpiler comprises a main body made of two metal plates, generally contained in vertical planes, braced together and articulated to the main frame of the loader, and two sloping or rearwardly inclined elements parallelly mounted on the main body and separated from the main body by a certain distance "K". These sloping elements are provided with means to minimize penetration of the ground, and can be called "teeth."

The lateral separation of the teeth from the main curved body on the present invention greatly enhances the possibility of the soil particles separating from the cane, flowing back and rearwards along the teeth, while the cane being pushed is subsequently contacted by the main curved body of the pushpiler that does not have to touch the ground. The soil combination is further reduced in the present invention by providing means to effectively reduce the ground penetration by the separate teeth, according to other particulars of this invention, as will be seen subsequently.

Another aspect of the present invention is related to hydraulically actuated means that provide an automatic and synchronized elevation of the grab over the ground during its closing movement, eliminating the ground penetration by the grab's tips.

BRIEF DESCRIPTION OF THE DRAWINGS

The following figures and descriptions help explain the different aspects of the present invention.

DESCRIPTION OF THE PREFERRED EMBODIMENTS

Figure 1:
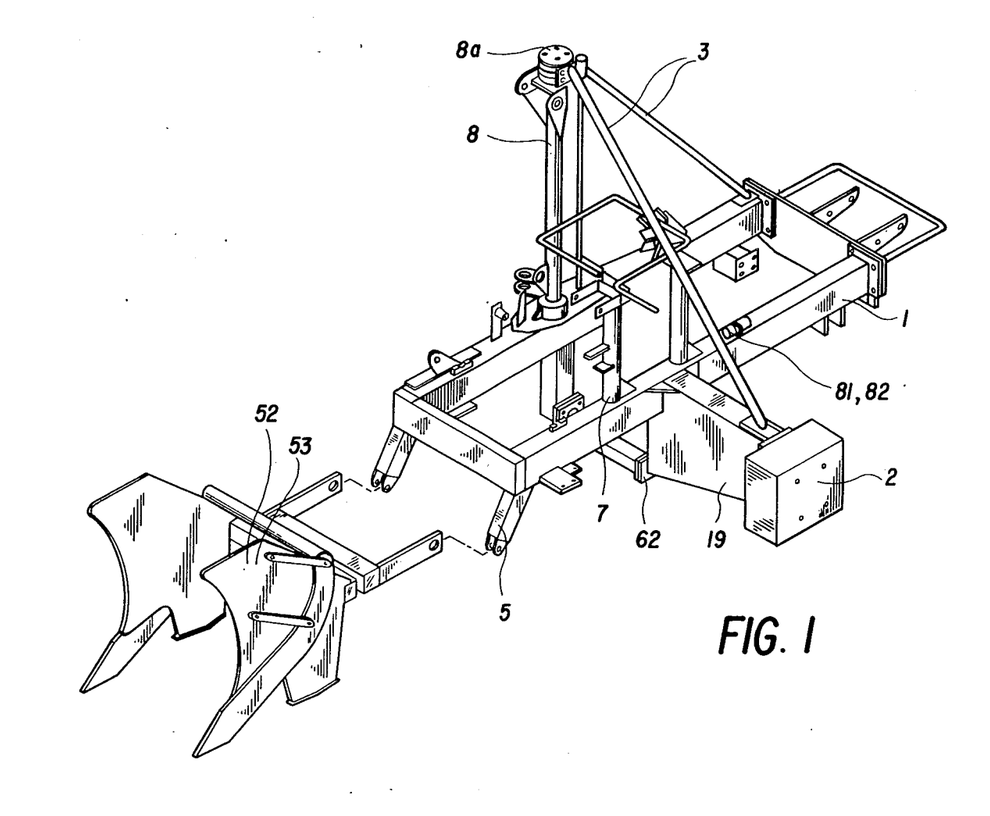
FIG. 1 shows a partial view in perspective, of one version of the new pushpiler.

Referring to FIG. 1, features of one embodiment of the invention are shown. A pushpiler 52 according to the invention attaches to arms 5 of a frame 1, which, in turn, may be attached to a tractor or other motorized harvesting vehicle.

Figure 2:
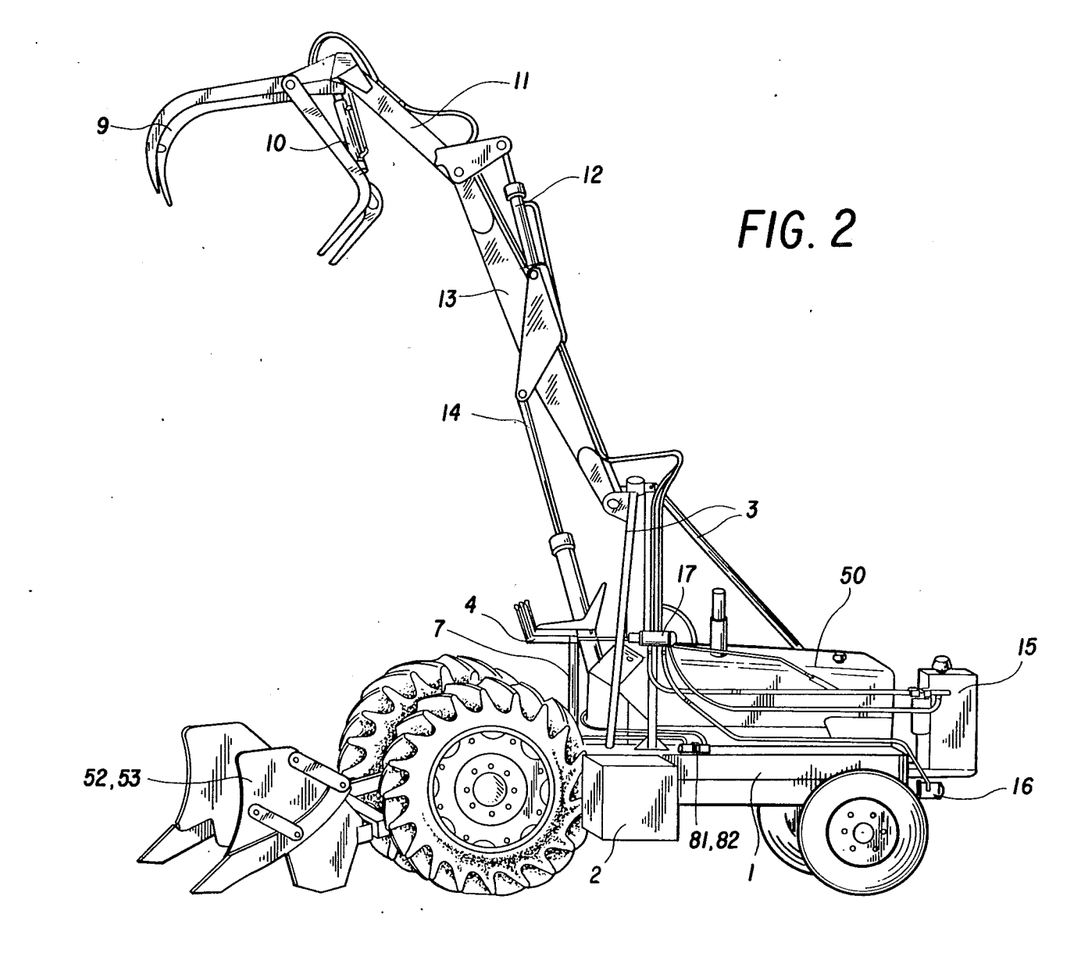
FIG. 2 shows a lateral view of a tractor-mounted loader.
Figure 3:
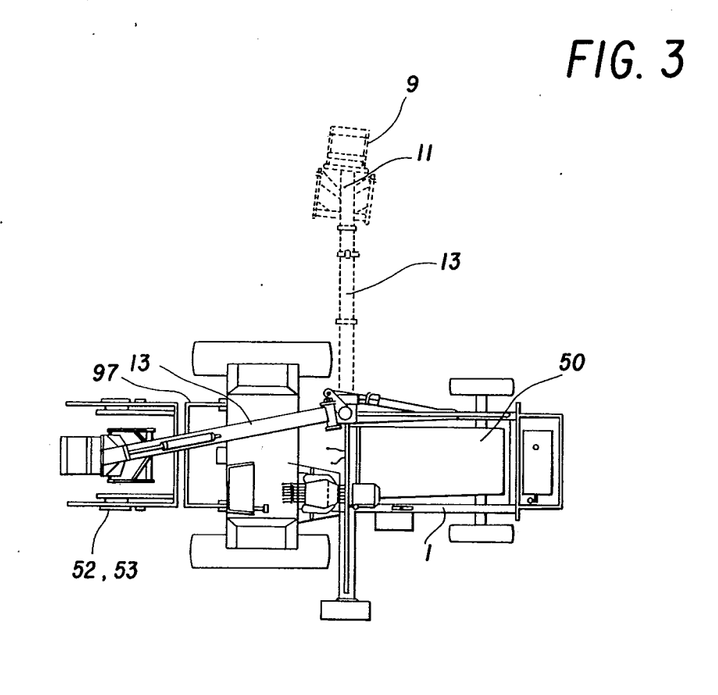
FIG. 3 shows in plan view the loader illustrated in FIG. 2.

FIGS. 2 and 3 show a mechanical sugar cane grab loader according to aspects of the invention. The illustrated device has a pushpiler 52 mounted to the front of a tractor-like vehicle. The grab 9 is mounted at the end of the hydraulically actuated boom, the boom having two sections 11,13. Vertical movement of the boom sections 11,13 is controlled by the operator, who can control the hydraulic cylinders 10,12,14 through control valves 17. Operation of the grab 9, according to aspects of the invention, will be described later.

Figure 4:
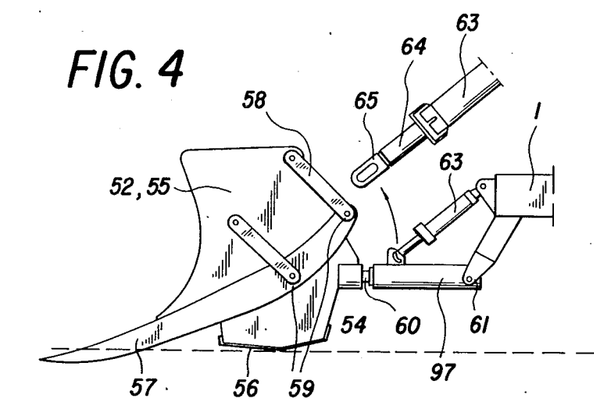
FIG. 4 shows a lateral view of a version of the new pushpiler provided with floating teeth.
Figure 4A:
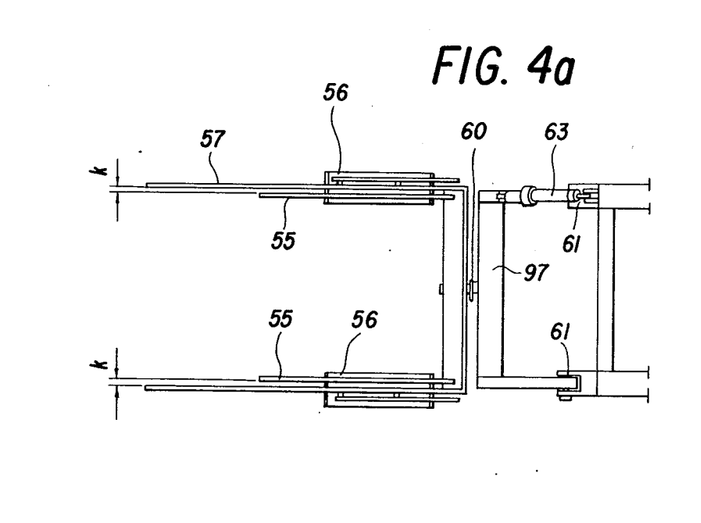
FIG. 4a shows in plan view the same floating teeth pushpiler as shown in FIG. 4.

Various embodiments of frontally and articulatedly mounted pushpilers are shown in the figures, generally. Referring to FIGS. 4 and 4a, a first version is shown having floating teeth 57, capable of lateral oscillation to aid in limiting ground penetration by the teeth 57. The pushpiler 52 has a support frame 54, with two lateral and parallel plates 55 to form, in combination, a pushpiler main body. The plates 55 have a concave frontal shape to permit the sliding and bundling of the cane. Horizontal supporting plates 56 are fitted to the lower part of the main body plates 55. By resting on top of the ground, the supporting plates 56 further help limit the soil penetration of the teeth 57.

According to an aspect of the invention, the teeth 57 are separated by a lateral distance "K" from the main body plates 55 by arms 58 and axles 59. This mounting forms an articulated parallelogram that permits a free movement of the teeth tips following a rearwardly inclined direction.

The initial height control of this floating tooth pushpiler is set by a cylinder 63 and its associated fittings 65. Ground penetration by the teeth 57 is effectively limited by the lateral oscillation of the teeth provided by the bearing 60, along with the free rearwardly inclined motion of the teeth 57.

Figure 5:
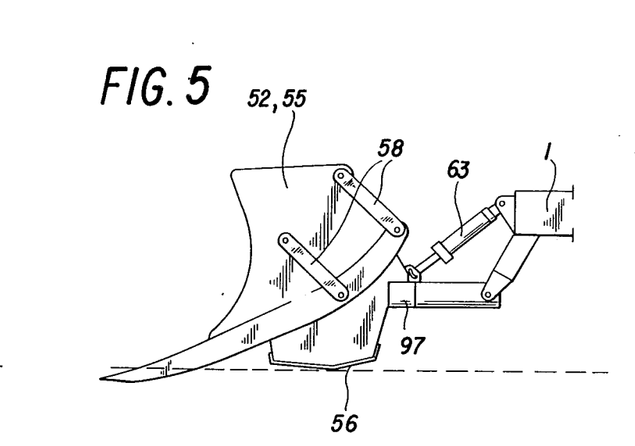
FIG. 5 and FIG. 5a show two views of another version of the floating teeth pushpiler.
Figure 5A:
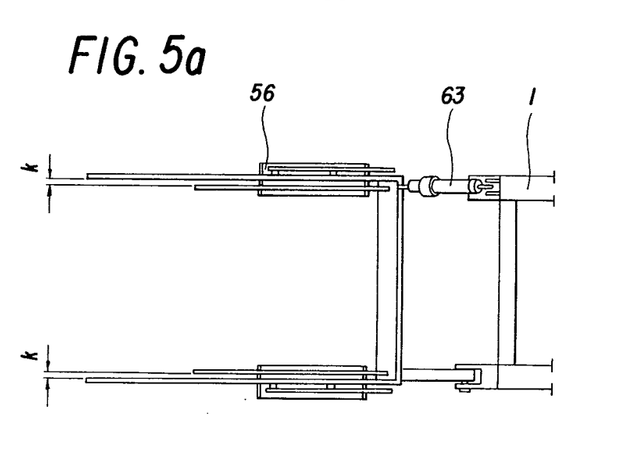

The pushpiler of FIGS. 5 and 5a is substantially similar to the aforementioned pushpiler of FIGS. 4 and 4a, except that the bearing 60 for providing lateral oscillation of the teeth is omitted.

Figure 6:
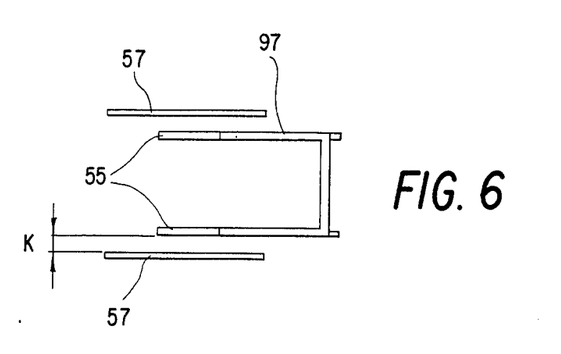
FIG. 6 shows still another version of a floating teeth pushpiler.
Figure 6A:
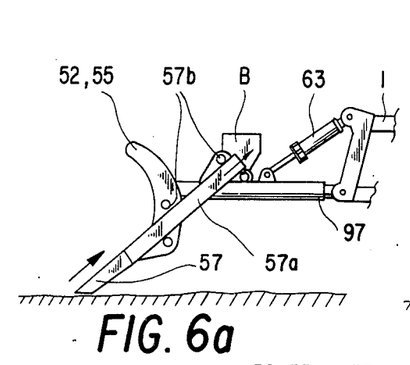
FIGS. 6a, 6b and 6c, show other versions of the floating teeth.
Figure 6B:
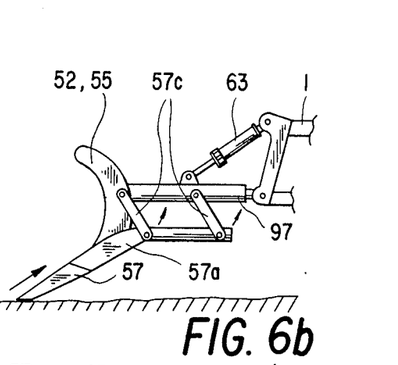
Figure 6C:
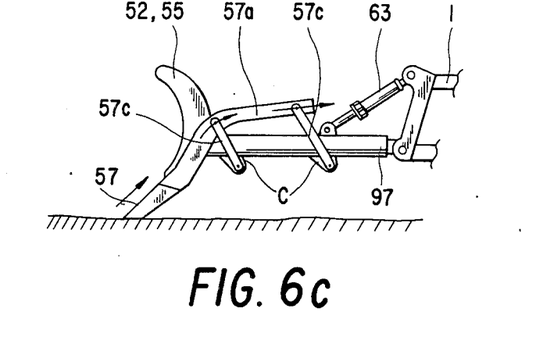
Figure 7:
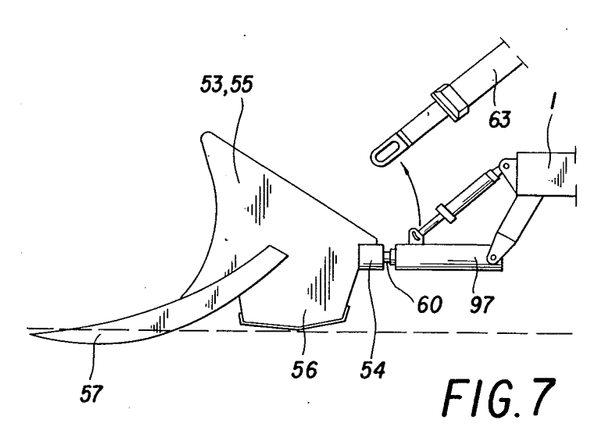
FIGS. 7, 7a, 8 and 8a show other possible versions of the floating teeth concept.
Figure 7A:
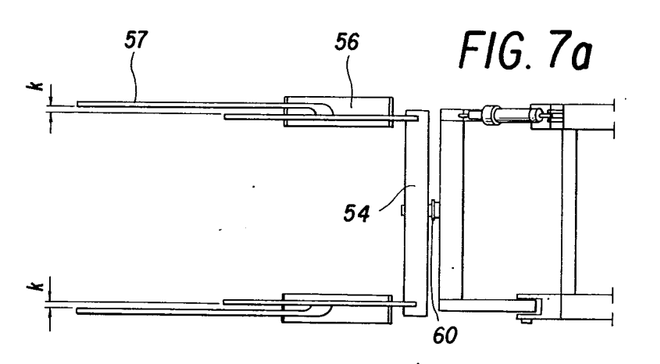
Figure 8:
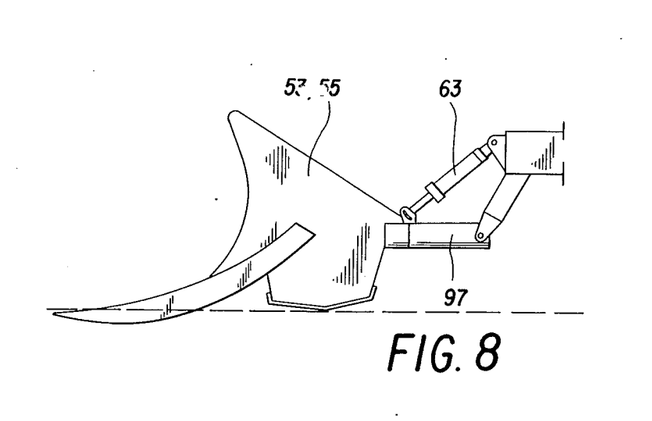
Figure 8A:
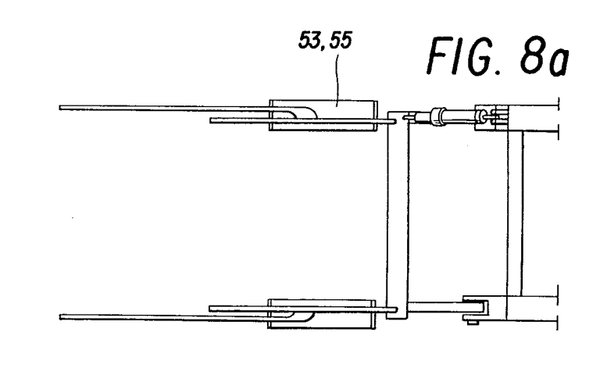

In pushpilers according to the invention illustrated in FIGS. 6-6c, both the ability to provide lateral oscillation and the above-described embodiments are omitted. In these particular embodiments, the central body plates 55 do not touch the ground during normal operation of the floating pushpiler. The floating action on these versions is provided only by the independent and free movement of the teeth 57, along a rearwardly inclined direction. This free movement can be provided by any of the three mounting versions shown in FIGS. 6a, 6b and 6c. The height control of the central body 55, in this embodiment, is adjusted by the operator through the hydraulic cylinder 63. This is the preferred version, for its simplicity and tried efficiency.

Two other possible versions, of less interest, are illustrated in FIGS. 7, 7a, 8 and 8a.

Figure 9:
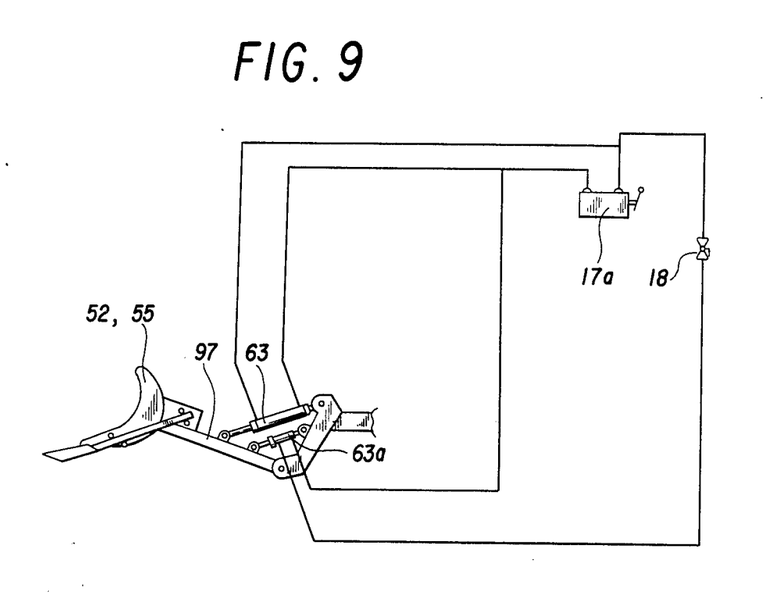
FIG. 9 shows a hydraulically adjusted limiter for the height adjustment of a pushpiler.

An important device that makes operation of the preferred version simpler is the hydraulic height limiter 63a shown in FIG. 9. This hydraulic limiter comprises a second cylinder 63a connected in parallel with the main cylinder 63, but having a simple on-off hydraulic valve 18 interposed in the hydraulic connection exiting the rod side of the limiting cylinder 63a. With valve 18 open, the operator adjusts the optimum height of the pushpiler, according to terrain conditions, by operating cylinders 63 and 63a in parallel. Having adjusted the desired height, the operator closes the on-off valve 18, trapping the hydraulic fluid in the rod side of cylinder 63a. From there on, the operator may raise the pushpiler at will be operating cylinder 63, but when releasing or lowering the pushpiler, it always returns to the preset height defined by the limiting action of the blocked fluid in cylinder 63a, i.e., the rod of cylinder 63a cannot extend beyond the distance the rod was extended when the on/off valve 18 was closed by the operator.

Figure 10:
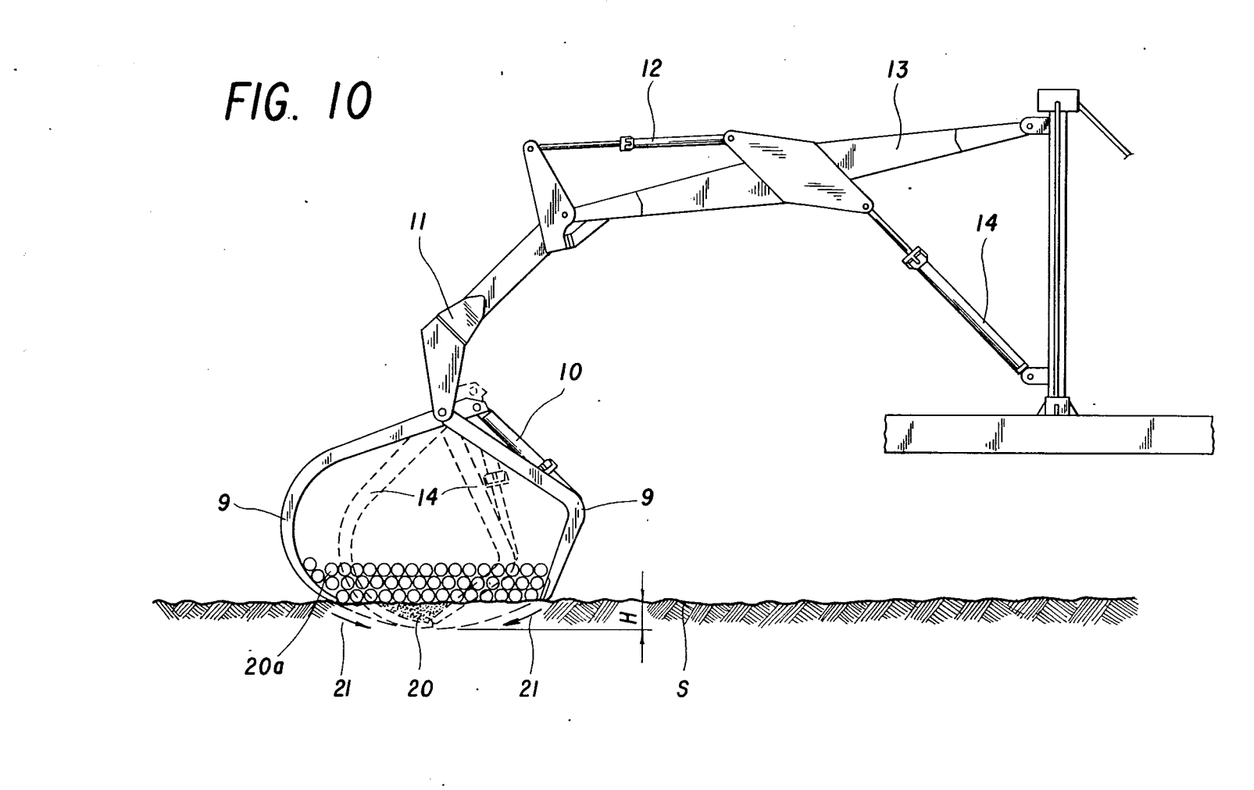
FIG. 10 shows the ground penetration action of a conventional grab in its closing movement.

The second part of this invention covers the elimination of ground penetration by the grab in its closing movement. FIG. 10 illustrates the ground penetration of a conventional operation. Grab 9 penetrates the depth H on the soil s in its closing movement to the closed position 14, moving along the indicated arrows 21. An area of soil 20 is collected with the cane 20a. To eliminate the soil penetration it is necessary to provide a synchronized lifting of the grab 9 by the height H during the closing movement. Three different means of providing this synchronized lifting movement are covered by the present invention.

Figure 11:
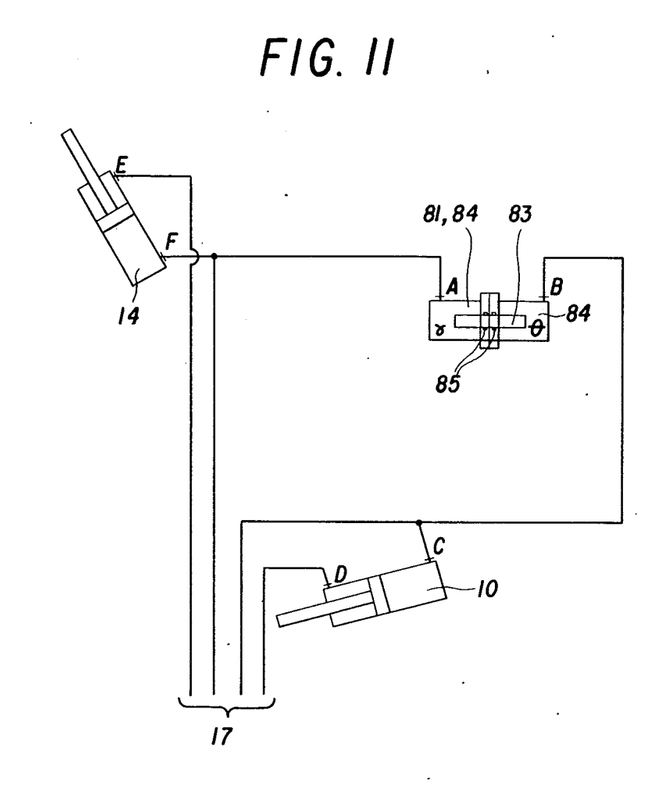
FIGS. 11 and 12 show two hydraulic parallel circuits for an automatic device that limits the ground penetration action of the grab's tips.
Figure 12:
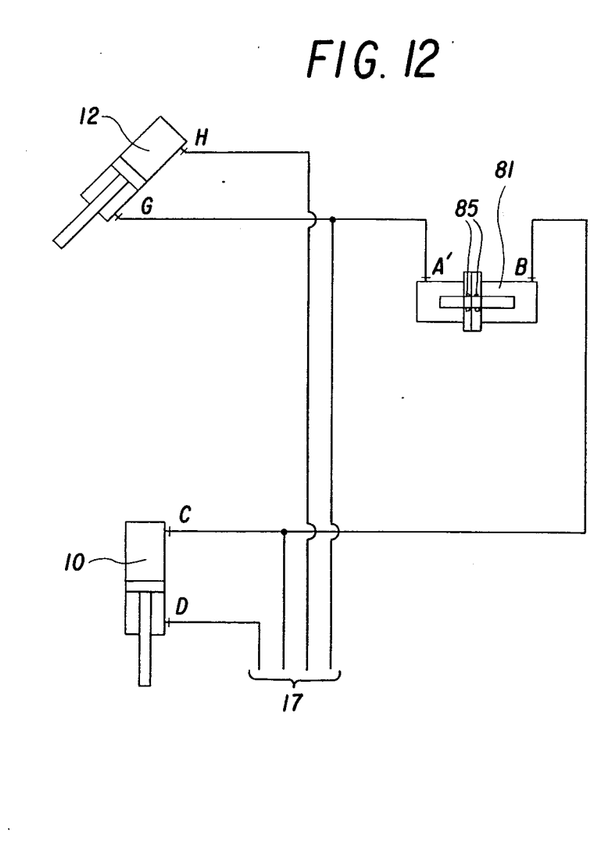

In a first version represented by FIGS. 11 and 12, an auxiliary hydraulic cylinder 81 is connected in parallel with the grab actuating cylinder 10 and the boom actuating cylinders 12,14 in such a way that the actuating pressure on the grab cylinder moves the piston 83 of the auxiliary 81. The volume of hydraulic fluid contained on the other side of said piston 83 is injected into the boom cylinders 12,14 and is exactly sufficient to raise the grab by the required height H.

Figure 13:
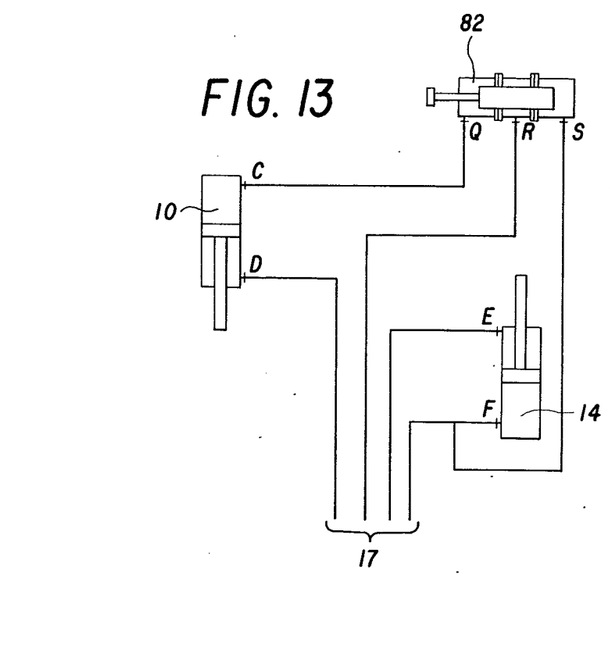
FIGS. 13 and 14 show two versions of a series hydraulic circuit of the ground penetration automatic limiter of the grab.
Figure 14:
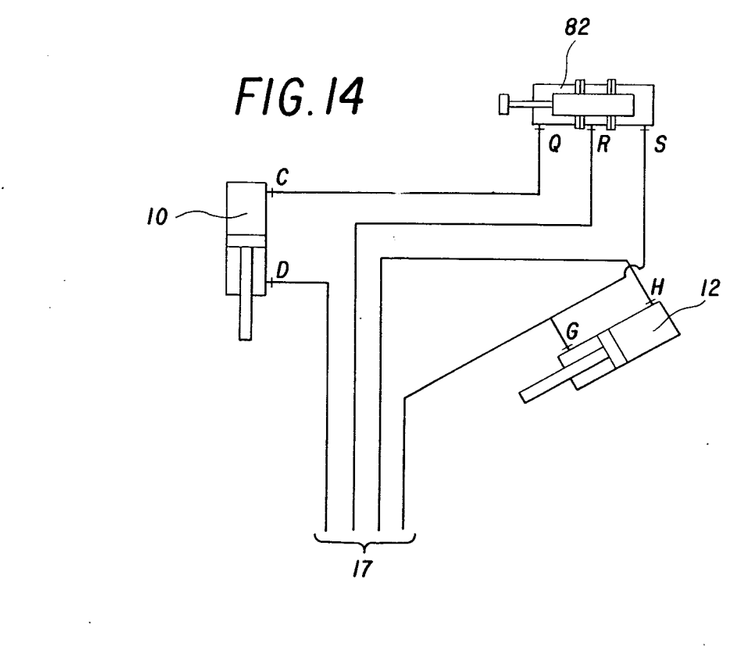
Figure 15:
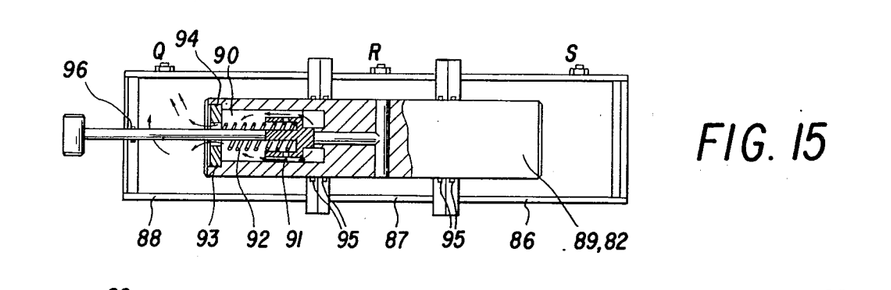
FIGS. 15, 16, 17, 18 and 18a illustrate two other versions of the grab's automatic ground penetration limiter, and their connections to the grab and articulated boom actuating cylinders.

In a second version, represented in FIGS. 13, 14, and 15, a special three stage auxiliary hydraulic cylinder 82 is series connected between the grab cylinder 10 and the boom cylinders 12,14, in a way that the hydraulic fluid dislodged by the closing action of the grab cylinder 10 actuates the internal piston 89 of the auxiliary cylinder 82. The required fluid volume contained in the side of the auxilliary cylinder 82 actuates the boom cylinders 12,14, raising the grab by the required height H.

Figure 16:
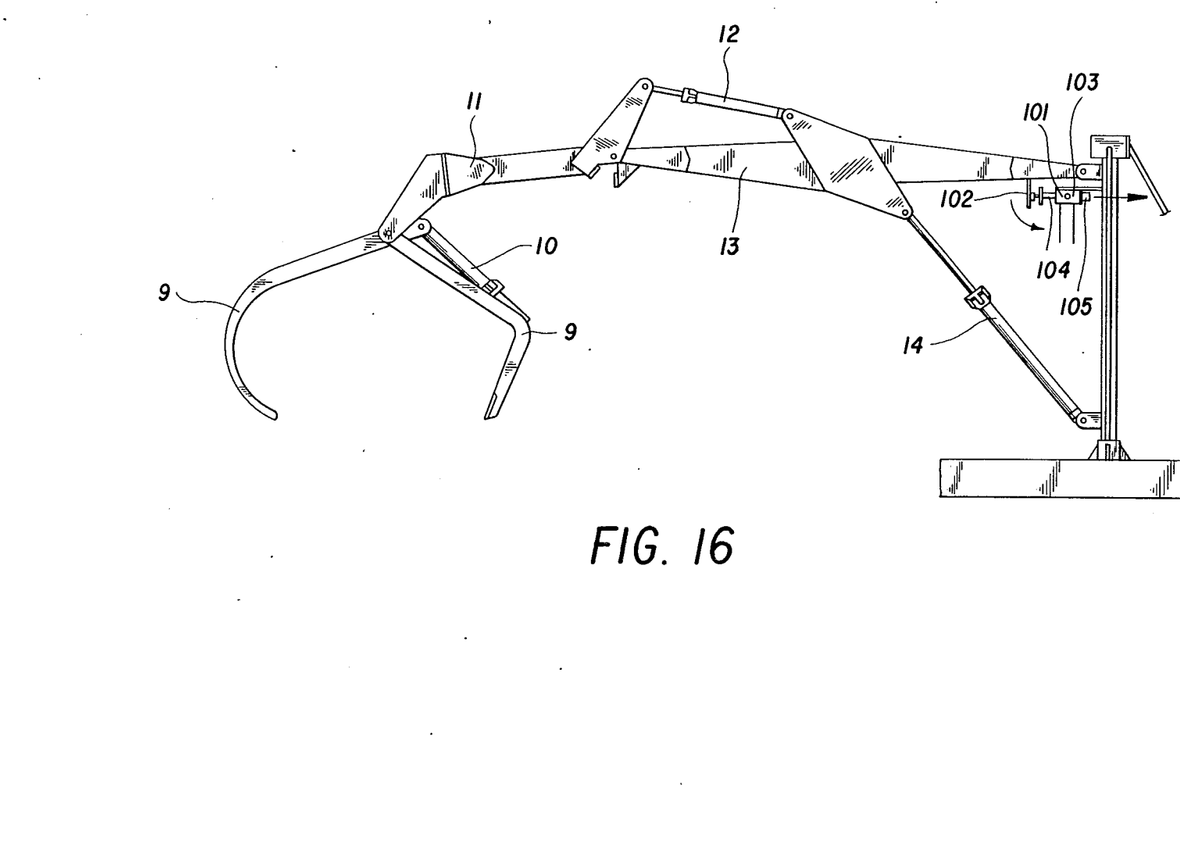
Figure 17:
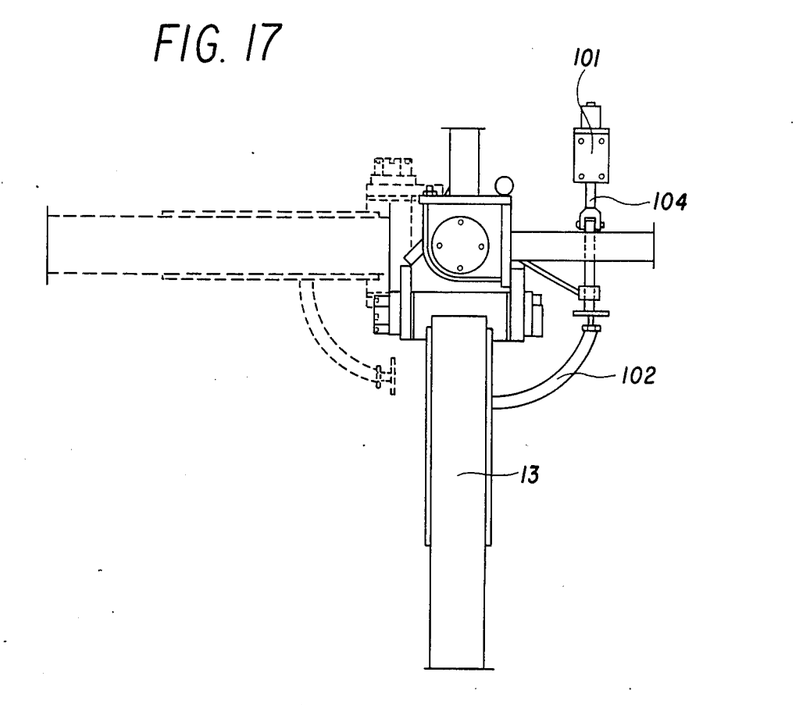
Figure 18:
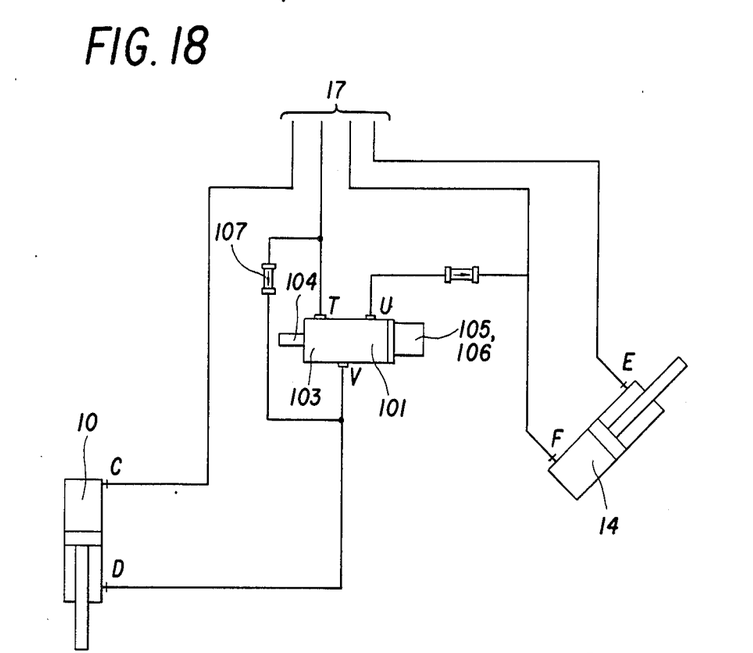
Figure 18A:
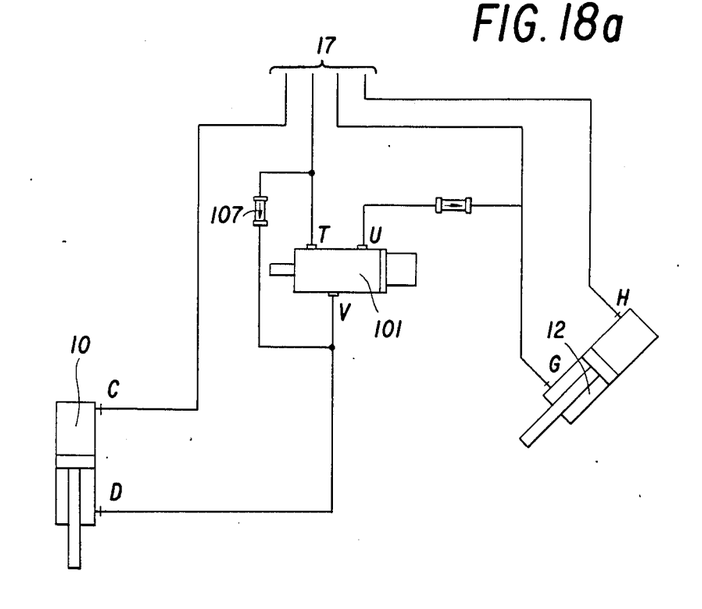

The third and preferred version uses a servo valve 101 mounted on the boom or the boom support structure of the loader, as shown by FIGS. 16 and 17. The valve 101 is actuated by the relative position of the boom to the support structure, i.e., when the boom 13 is in its lowest position, placing the grab 9 over the cane lying on top of the ground. Actuation of servo valve 101 is accomplished by actuator 102 contacting a plunger 104 on the valve 101. When this servo valve 101 is actuated, the grab cylinder 10 is series connected by parts U,V of the servo valve 101 with either of the boom cylinders 12, 14, as shown by FIGS. 18 and 18a. In these situations, the closing movement of the grab 9 forces hydraulic fluid coming from part D through parts V,U of the servo valve 101 into one of the cylinders 12, 14 of the boom, depending on the particular arrangement, thus raising the grab.

As soon as the desired height H is attained, the adjustable actuator 102 frees the servo valve 101. By the action of an internal spring (not shown), valve 101 returns to its normal non-actuated position, closing port U and establishing connection between ports V and T. In this position (non-actuated) the series connection between the grab 10 and bom cylinders is interrupted, and all cylinders revert to their normal independent connections to the central valve bank 17.

The servo valve 101, therefore, when actuated establishes connection between ports V and U, closing port T; when not actuated, it returns by an internal spring action to a position that closes port U and connects ports V and T. A check valve 107 is connected between ports T and V of the servo valve 101, to enable the operator to open the grab with cylinder 10 when the servo valve 101 is actuated.

I claim:
1. A sugar cane grab loader, comprising:
an articulated and hydraulically actuated grab;
a hydraulically actuated boom for lifting the grab, said grab being mounted at an end of the boom, said boom being connected to a support structure;
means connected to said support structure for pushing sugar cane on top of soil to form bundles, said bundles adapted to be grabbed by said hydraulically actuated grab, said pushing means comprising: at least two main body plates, said plates being vertically oriented and substantially coplanar with the direction of pushing said cane, said plates being mounted in spaced relationship to one another; and a tooth articulatedly connected to each of said main body plates, each said tooth having a tip extending downwardly and forwardly from each said main body plate, said articulated connections providing means for limiting ground penetration by said tooth tips during said pushing of cane, said limiting occurring substantially without hydraulic control of said teeth and means for automatically lifting said grab a predetermined distance as a bundle of cane is grabbed 2. The sugar cane grab loader of claim 1, further comprising horizontal supporting plates connected to the lower edge of each of said body plates.

3. The sugar cane grab loader of claim 1, further comprising:
means for controlling the height of said pushing means above the ground, said means including a settable hydraulic cylinder connecting said pushing means to said support structure so that said pushing means may not be lowered below a height determined by said settable hydraulic cylinder.

4. The sugar cane grab loader of claim 1, further comprising:
an auxilliary hydraulic cylinder connected to a grab-actuating hydraulic cylinder and at least one boom-actuating hydraulic cylinder, so as to cause said boom-actuating cylinder to lift said boom as said grab-actuating cylinder causes said grab to close.

5. The sugar cane grab loader of claim 1, further comprising:
a two-way servo valve having a first position and a second position, said valve being in its first position when said grab is positioned by said boom at its lowest point, an exhaust port of said grab-actuating cylinder being connected through said valve position to an intake port of at least one boom actuating cylinder so as to cause said boom-actuating cylinder to lift said boom as said grab-actuating cylinder causes said grab to close, said valve returning to a second position, disconnecting said grab- and boom-actuating cylinders from each other once said grab attains a predetermined height above said lowest point.

6. The sugar cane grab loader of claim 1, wherein said teeth are freely movable in a rearwardly inclined direction, substantially parallel to the slope of said teeth, with respect to said main body plates.

7. The sugar cane grab loader of claim 6, further comprising pairs of opposed guiding rollers mounted on said main body plates, said teeth mounted between said rollers.

8. The sugar cane grab loader of claim 6, wherein said pushing means is connected to said support structure through a horizontal and longitudinal axle pivot and bearing arrangement.

9. The sugar cane grab loader of claim 6, further comprising, for each said tooth, a pair of swinging arms connected to each said main body plate, said teeth being articulatedly connected to said plates via said pairs of swinging arms.

10. The sugar cane grab loader of claim 9, wherein said teeth are connected to lower ends of said swinging arms, and said main body plates are attached to upper ends of said swinging arms.

11. The sugar cane grab loader of claim 9, wherein said teeth are connected to upper ends of said swinging arms, and said main body plates are attached to lower ends of said swinging arms.

* * * * *